United States Patent Office 3,055,816
Patented Sept. 25, 1962

3,055,816
INTERMETALLIC COMPOSITIONS
Robert M. Paine, Lakewood, and Albert James Stonehouse, Lyndhurst, Ohio, assignors, by mesne assignments, to the United States of America as represented by the United States Atomic Energy Commission
No Drawing. Filed Oct. 19, 1959, Ser. No. 847,434
4 Claims. (Cl. 204—154.2)

This invention relates to new compositions of matter consisting of solid solutions of the intermetallic compounds $ZrBe_{13}$ and $UBe_{13}$ mixed in any proportion into each other. These compositions are unique from other known nuclear fuel compositions since they are resistant to oxidation for indefinite periods of time at temperatures on the order of 2800° F. They are, therefore, excellent nuclear fuel materials for operation at very high temperatures.

One of the problems encountered in the design of nuclear reactors capable of serving in the propulsion units of aircraft and missiles is the provision of fuel element structures which will be stable in the presence of the atmosphere at the high temperatures existing in such reactors. Accordingly, it is the object of this invention to provide a uranium-containing nuclear fuel material which is stable to the atmosphere at very high temperatures and which is useful in the construction of fuel element bodies of nuclear reactors, in particular gas cooled reactors.

Neither uranium metal nor any of the other possible nuclear fuel metals such as thorium or the transuranic elements is sufficiently inert to be used in the construction of fuel element bodies for service at high temperatures without protective cladding. A further practical limitation on such materials is the melting points of the individual metals. Uranium oxide in combination with other oxides or metals is being used as a high-temperature fuel element, but such materials are limited to relatively low temperatures in the metal mixtures, and major losses of uranium oxide by volatilization processes occur at high temperature in the oxide systems developed to date.

This invention provides a material which is stable to the atmosphere at temperatures up to 2800° F. for indefinite periods of time. This material is a solid solution of the intermetallic compound $UBe_{13}$ in the intermetallic compound $ZrBe_{13}$. These two compounds are isomorphic and capable of mutual solid solubility in the composition range of from 100% $ZrBe_{13}$ to 100% $UBe_{13}$. However, preferred compositions contain from 5% to 65% by weight of $UBe_{13}$, which is equivalent to 3.35% to 43.6% of U.

Massive fabricated specimens of $UBe_{13}$ are oxidation resistant for periods of time on the order of 25 hours at 2300° F. This is not considered satisfactory for the fuel of gas-cooled nuclear reactors operating at this temperature range. Upon longer time exposure at 2300° F., $UBe_{13}$ is completely oxidized.

The oxidation susceptibility of $UBe_{13}$ at high temperatures was found to be retarded by combining $UBe_{13}$ with $ZrBe_{13}$. Accordingly, in order to provide a nuclear material stable for indefinite periods of time at temperatures in the neighborhood of 2800° F., solid solutions of $UBe_{13}$ in $ZrBe_{13}$ were prepared, fabricated and tested. These solid solutions were prepared by heating mixtures of $UBe_{13}$ and $ZrBe_{13}$ powders to a sufficiently high reaction temperature or by heating ternary mixtures of uranium, zirconium and beryllium metal powders at a sufficiently high temperature. Fabrication was accomplished by either of two methods; sintering or hot pressing the reacted compound $(U,Zr)Be_{13}$ powder, or hot pressing a suitable mixture of $ZrBe_{13}$ and $UBe_{13}$ powders. Test data of the various combinations are summarized in the table below.

Table

| Material | Test Temp. (° F.) | Weight Gain (mg./cm.²) | | Mils Pen. Calc. | Percent of Absolute Density | Atmosphere |
|---|---|---|---|---|---|---|
| | | 25 hrs. | 100 hrs. | | | |
| 7.5 wt. percent U. | 2,500 | 4.6 | 6.8 | 0.9 | 97.6 | 57° F. dew-point air. |
| Do | 2,700 | 3.1 | 6.7 | 0.9 | 98.0 | −32° F. dew-point air. |
| 10 wt. Percent U. | 2,500 | 3.3 | 5.2 | 0.7 | 100 | 57° F. dew-point air. |
| Do | 2,500 | 2.7 | 4.2 | 0.5 | 100 | −32° F. dew-point air. |
| Do | 2,800 | 7.6 | 12.5 | 1.6 | 100 | ambient air. |
| Do | 2,900 | 11.7 | 23.9 | 3.0 | 99.2 | −32° F. dew-point air. |
| 15 wt. percent U. | 2,300 | 2.5 | 3.9 | 0.5 | 93.0 | 57° F. dew-point air. |
| Do | 2,500 | 3.3 | 5.7 | 0.7 | 94.9 | 57° F. dew-point air. |
| 42 wt. percent U. | 2,300 | 8.2 | 16.2 | 2.1 | 96.0 | −32° F. dew-point air. |
| Do | 2,500 | | 6.1 | 0.8 | 100 | −32° F. dew-point air. |

The results of the table show that the indicated compositions of $(U,Zr)Be_{13}$ solid solutions were quite oxidation resistant at the indicated temperatures. A criterion of 2 mils penetration in 100 hours is usually established as good oxidation resistance for a fuel element in these temperature ranges. It will be noted that lower density samples did not perform quite as well as high density samples which follows previous knowledge on the oxidation of materials. The composition at 42 weight percent uranium represents an approximately equimolar solution of $UBe_{13}$ and $ZrBe_{13}$. This is the highest ratio of $UBe_{13}$ to $ZrBe_{13}$ tested and should represent the upper practical limit of fuel loading in actual fuel elements.

While this invention has not been tested for fuels other than uranium, thorium and plutonium also form isomorphic compounds with $ZrBe_{13}$ and would be expected to enter in solid solution and also form oxidation resistant solutions.

What is claimed is:
1. The composition of matter consisting of the equimolar solid solution of $UBe_{13}$ in $ZrBe_{13}$.
2. A composition of matter consisting of a solid solution of $UBe_{13}$ in $ZrBe_{13}$ where the concentration of $UBe_{13}$ is from 5 to 66 weight percent.
3. A composition of matter consisting of a solid solution of $UBe_{13}$ in $ZrBe_{13}$ where the concentration of $UBe_{13}$ is from 1 to 90 weight percent.
4. A nuclear fuel element consisting of the composition of matter defined in claim 3.

References Cited in the file of this patent

"Zirconium," by G. L. Miller, published in London by Butterworth's Scientific Publications, 1957, pages 352–353.

Second International Conference on Peaceful Uses of Atomic Energy, September 1958, vol. 6, pages 116, 119, 120.